United States Patent
Schön

(10) Patent No.: US 8,716,611 B2
(45) Date of Patent: May 6, 2014

(54) WEIGHING SCALE HOUSING WITH CARRIER UNIT FOR ELECTRONICS MOUNTED ON GUIDING TRACTS FOR REMOVAL FROM THE HOUSING, WHEREIN THE CARRIER ALSO SERVES AS A CLOSURE PLATE FOR THE BOTTOM OF THE PEDESTAL OPENING

(75) Inventor: Thomas Schön, Balingen (DE)

(73) Assignee: Mettler-Toledo (Albstadt) GmbH, Albstadt (DE)

( * ) Notice: Subject to any disclaimer, the term of this patent is extended or adjusted under 35 U.S.C. 154(b) by 396 days.

(21) Appl. No.: 13/198,431

(22) Filed: Aug. 4, 2011

(65) Prior Publication Data

US 2012/0031684 A1    Feb. 9, 2012

(30) Foreign Application Priority Data

Aug. 5, 2010  (EP) ................................ 10172015

(51) Int. Cl.
*G01G 21/28* (2006.01)
*H05K 5/06* (2006.01)
*H05K 7/10* (2006.01)
*H05K 7/14* (2006.01)

(52) U.S. Cl.
USPC ...... 177/238; 177/241; 361/679.01; 361/752; 361/753; 361/796; 312/223.1; 312/223.2; 174/50; 174/50.5; 174/559

(58) Field of Classification Search
USPC ............ 177/238–244; 312/100, 223.1, 223.2, 312/223.3, 296; 361/679.01, 752, 753, 796; 174/50, 50.5, 559
See application file for complete search history.

(56) References Cited

U.S. PATENT DOCUMENTS

| | | | |
|---|---|---|---|
| 4,008,776 A * | 2/1977 | Kushmuk | 177/210 R |
| 4,022,326 A | 5/1977 | Marconi | |
| 5,533,631 A | 7/1996 | Marchetti | |
| 5,629,498 A * | 5/1997 | Pollock et al. | 177/15 |
| 5,738,226 A | 4/1998 | Dean | |
| 6,050,658 A * | 4/2000 | O'Sullivan et al. | 312/223.1 |
| 6,803,529 B2 * | 10/2004 | Takahashi | 177/119 |
| 2012/0032571 A1 * | 2/2012 | Schoen | 312/326 |

FOREIGN PATENT DOCUMENTS

| | | |
|---|---|---|
| DE | 102005060105 B3 | 1/2007 |
| DE | 202007010007 U1 | 10/2007 |
| DE | 102006033651 A1 | 1/2008 |
| DE | 202008008457 U1 | 10/2008 |

* cited by examiner

*Primary Examiner* — Randy W Gibson
(74) *Attorney, Agent, or Firm* — Standley Law Group LLP

(57) ABSTRACT

A weighing scale (10) has a display/operating unit (20), a scale platform (30), an electronic system (60) for the control of the scale (10), and a pedestal (40) that connects the display/operating unit to the scale platform. The pedestal contains a pedestal chamber (41). The pedestal also has a pedestal opening (42). A carrier element (70) is arranged in or at the pedestal chamber. At least parts of the electronic system are arranged on the carrier element, and the parts of the electronic system which are arranged on the carrier element can be at least partially taken out of the pedestal opening for servicing.

20 Claims, 3 Drawing Sheets

WEIGHING SCALE HOUSING WITH CARRIER UNIT FOR ELECTRONICS MOUNTED ON GUIDING TRACTS FOR REMOVAL FROM THE HOUSING, WHEREIN THE CARRIER ALSO SERVES AS A CLOSURE PLATE FOR THE BOTTOM OF THE PEDESTAL OPENING

CROSS-REFERENCE TO RELATED APPLICATION

This application is entitled to the benefit of a right of priority under 35 USC 119 from European application 10172015.9, filed 5 Aug. 2010. The content of that application is incorporated by reference as if fully recited herein.

TECHNICAL FIELD

The present invention concerns a weighing scale (hereinafter also referred to as a "scale", for short) with a display/operating unit, primarily for use in the food sector.

BACKGROUND

Scales of the type to which this disclosure pertains normally include a display/operating unit, a scale platform, and a weighing-oriented electronic system for the control of the scale. The display/operating unit is connected to the scale platform by means of a pedestal. The electronic system is arranged for the most part in the display/operating unit.

Scales used in the food sector need to be cleaned regularly. This often involves the use high-pressure cleaning equipment and aggressive cleaning agents. In order to ensure that no food residues accumulate on the scale, the respective housings of the display/operating unit, the weighing platform and the pedestal are made of stainless steel. The housings need to be sealed well enough to guarantee that no water or cleaning agent can penetrate into the interior of the housing. If water or cleaning agent were to enter into one of the housings, the electronic components inside the housing could suffer damage. Such sealed housings are known from the existing state of the art.

The parts of the electronic system that are built into the display/operating unit and those that are built into the scale platform need to communicate with each other. The communication takes place by means of cable connections. The cables can be routed along the outside of the pedestal, but this arrangement has the drawback that the cables which are dressed along the pedestal are exposed to abrasive influences. Some state-of-the-art pedestals have a hollow space, and the connecting cables are channeled through the hollow space inside the pedestal. By being enclosed in the pedestal, the connecting cables are thus protected during the abrasive cleaning process.

The electronics of the scale require maintenance at regular intervals. In order to gain access to the scale electronics, the housing of the scale platform and/or of the display/operating unit has to be opened.

Opening the housing is a cumbersome procedure, as several securing means have to be unfastened every time. As a further problem, opening the housing requires a housing part to be removed. An enclosure seal is arranged between this housing part and the rest of the housing. This enclosure seal is vulnerable and often suffers damage in the opening process. The damage to the enclosure seal often goes unnoticed during the maintenance service. As a consequence, cleaning agent or water will be able to penetrate into the interior of the scale platform and/or the display/operating unit during a subsequent cleaning process, whereby the electronics of the scale can be damaged.

Therefore, the task presents itself to create a weighing scale in which at least parts of the electronic system can be serviced without opening the housing of the scale platform or of the display/operating unit.

SUMMARY

This task is solved with a weighing scale possessing the features defined in the independent patent claim. Further advantageous embodiments are presented in the dependent claims.

The weighing scale according to the invention has a display/operating unit, a scale platform, an electronic system for the control of the scale, and a pedestal connecting the display/operating unit to the scale platform. The pedestal has a pedestal chamber and a pedestal opening. A carrier element is arranged in or at the pedestal chamber. At least parts of the electronic system are arranged on the carrier element, and the parts of the electronic system which are arranged on the carrier element can be at least partially taken out of the access opening for servicing.

This arrangement offers the advantage that the carrier element with the electronic circuitry arranged on it can be accessed without having to open the housing of the scale platform or of the display/operating unit.

The electronic system of the scale is configured so that when the carrier element is pulled out at least partially, the parts of the electronic system that are arranged on the carrier element remain connected to the rest of the scale electronics. This requires necessarily that the connecting cables between the parts of the electronic system that are arranged on the carrier element and the other parts of the electronic system are long enough.

The pedestal in a preferred embodiment is of an elongated shape and has a first end and a second end. The display/operating unit is arranged at the first end and the scale platform at the second end. The electrical cables are preferably protected from the influence of the ambient environment. To achieve this protection, the housing of the pedestal needs to be connected to the housing of the display/operating unit in such a way that the electrical cables are completely enclosed by the housing of the pedestal and the housing of the display/operating unit.

Ideally, in the operating position of the scale the pedestal has a predominantly vertical orientation, i.e. in the direction of gravity, so that the first end is at the top and the second end at the bottom. The pedestal opening is located at the second, lower end of the pedestal. The pedestal opening extends preferably in a horizontal plane, i.e. perpendicular to the direction of gravity. Consequently, the pedestal opening is accessible only from below. This has the advantage that the exposure to water splashing through the pedestal opening is reduced.

For additional protection, the pedestal opening is designed so that it can be closed up. This can be suitably accomplished for example with a closure plate which covers the pedestal opening against influences of the ambient environment. The closure plate can be fastened with reversible fastener means, for example screws. However, one could also use fastener means that can be disengaged without tools, such as for example snap connections. In addition, there can be a seal gasket arranged between the closure plate and the pedestal opening, whereby the penetration of dirt is further reduced.

It is also conceivable to arrange the pedestal opening vertically, i.e. in a sidewall of the pedestal. This arrangement is more exposed to splash water. It is therefore important that the vertically oriented pedestal opening is closed with a tight seal in order to prevent the penetration of dirt.

It is also possible to arrange parts of the scale electronics on the closure plate. The latter is in this case used as carrier element. This arrangement has the advantage that no additional carrier element is needed.

Not all parts of the scale electronics are equally sensitive to the penetration of dirt. For example, cables, glands and similar parts are far less sensitive to adverse effects of dirt than are printed circuit boards, microchips and the like. Accordingly, one of skill will be readily able to discern this sensitivity and to partition the scale electronics into "dirt sensitive" and "not dirt sensitive" groups. It is advantageous if those parts of the scale electronics that are sensitive to dirt are arranged in the scale platform and/or in the display/operating unit. Parts of the scale electronics that are less sensitive to dirt are arranged on the carrier element. This arrangement has the advantage that only the pedestal, but not the scale platform and/or the display/operating unit, needs to be opened for the servicing of a less dirt-sensitive part of the scale electronics. As a result, the dirt-sensitive parts are not exposed to the danger of contamination. As an additional advantage, the seal of the weighing platform and/or of the display/operating unit is not exposed to the danger of getting damaged.

If the outside dimensions of the carrier element approximately match the internal dimensions of the pedestal chamber, the carrier element can be inserted into the pedestal chamber without additional guiding elements. To ensure that the carrier element is free to slide in the pedestal chamber, the carrier element has to be dimensioned slightly smaller than the pedestal chamber. However, the dimensions of the carrier element should not be significantly smaller than the dimensions of the pedestal chamber, because otherwise the carrier element could change its position uncontrollably inside the pedestal chamber. This would be undesirable especially when transporting the scale, because the uncontrolled movement of the support could have the result that electronic components could break loose from the carrier element.

Advantageously, the carrier element is of a predominantly flat configuration, and the carrier element is slidably seated in the pedestal chamber. This has the advantage that the carrier element can be removed from and inserted into the pedestal opening without the use of tools.

There can be positioning elements arranged on two opposite sides of the carrier element, which serve to hold the carrier element in a defined position in the pedestal chamber. A positioning element can have the form of a wall that is arranged perpendicular to a surface of the carrier element.

The carrier element can for example be slidably seated by means of guide tracks in the pedestal chamber. The guide tracks can be arranged on the carrier element as well as in the pedestal chamber, but other configurations are also conceivable.

Many scales require an outside power supply cable and/or at least one signal line for the exchange of data with the weighing cell that is arranged in the weighing platform and/or with instruments or components external to the scale. In practice, the power supply cable needs to be exchanged if the scale is used in a different country with different country-specific power plugs. The signal lines and/or the power supply cables have to be exchanged if the connection between external electronic instruments or components and the electronics of the scale have to be set up or disconnected.

Ideally, the electrical cables for the power supply and/or the signal lines are connected only to components that are arranged on the carrier element. This arrangement has the advantage that when the power supply cable or the signal lines are exchanged, adaptations have to be made only to components on the carrier element. The scale platform and/or the display/operating unit do not have to be opened.

Ideally, the electrical cables for the power supply and/or the signal cables are connected to other electronic components of the scale through connector elements. It is also possible to use plug sockets or clamp terminals.

In one possible embodiment, the pedestal has openings for the passage of electrical cables for the power supply of the scale and/or signal cables. These openings are arranged at the second end. This arrangement has the advantage that the cables are located close to the carrier element, which facilitates the exchange of the cables.

At least one positioning element can be configured in the form of an upstanding wall which partitions one surface of the carrier element into a first and a second domain. In a preferred embodiment, the terminal connection of the electrical cables of the power supply is arranged in the first domain, while the connection for the signal cables is arranged in the second domain. This arrangement has the advantage that the electrical cables are spatially separated from the signal cables and harmful interference between the cables is diminished.

BRIEF DESCRIPTION OF THE DRAWINGS

An example of an embodiment of a weighing scale having these limitations is presented in the following drawing figures, wherein identical parts are identified by identical reference numbers and wherein.

DETAILED DESCRIPTION OF THE DRAWINGS

Figure 1:
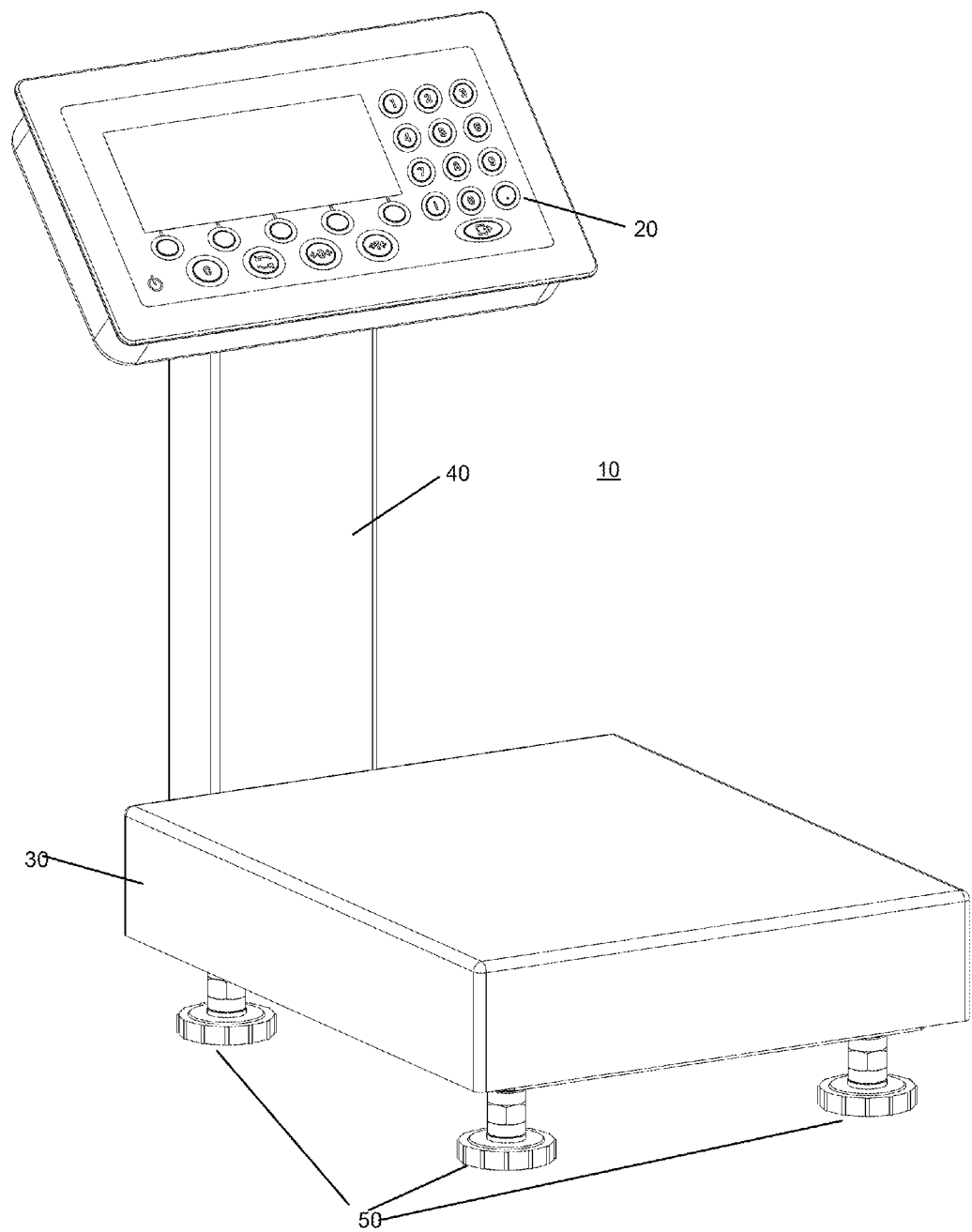
FIG. 1 is a perspective view of the front side of an embodiment of the weighing scale.

FIG. 1 shows a perspective view of the front side of an embodiment of a weighing scale 10. The scale 10 includes a display/operating unit 20, a scale platform 30 and a pedestal 40. The scale platform 20 has a predominantly horizontal platform surface which is oriented at a right angle to the direction of gravity and serves to receive the weighing object. The scale platform stands on four feet 50. Ideally, the feet 50 are height-adjustable in order to ensure that the scale is horizontally leveled. The display/operating unit 20 serves for the visual presentation of the weighing result and the operation of the scale 10. The pedestal 40 serves to hold the display/operating unit 20 in a user-friendly position.

Figure 2A:
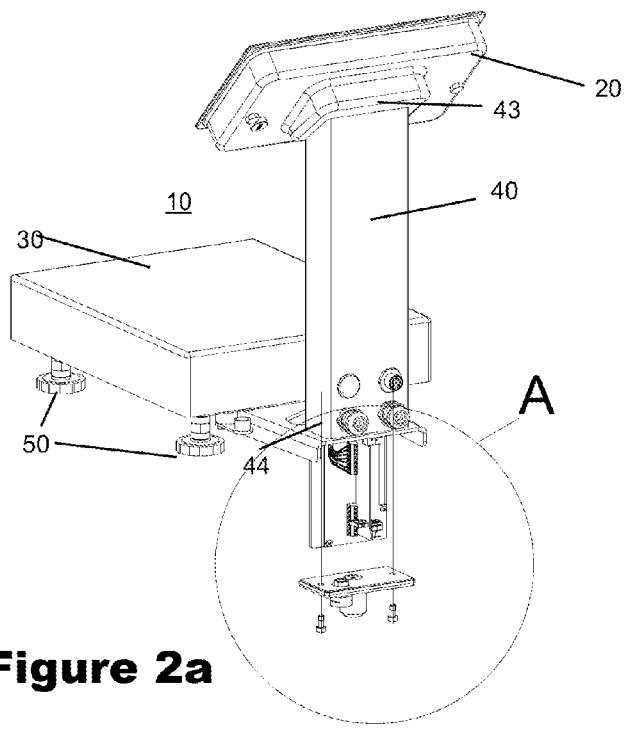
FIG. 2a is a perspective view of the backside of the FIG. 1 weighing scale, in a position for servicing.

FIG. 2a shows a perspective view of the backside of the scale 10 in a position for servicing, with the pedestal 40 opened. The pedestal 40 is oriented vertically and has a first end 43 and a second end 44. In the operating position, the first end 43 is at the top and the second end 44 at the bottom. The display/operating unit 20 is arranged at the first end 43 and the weighing platform 30 at the second end 44. The pedestal 20 is hollow inside and has a pedestal chamber 41 in which parts of the scale electronics are arranged.

Figure 2B:
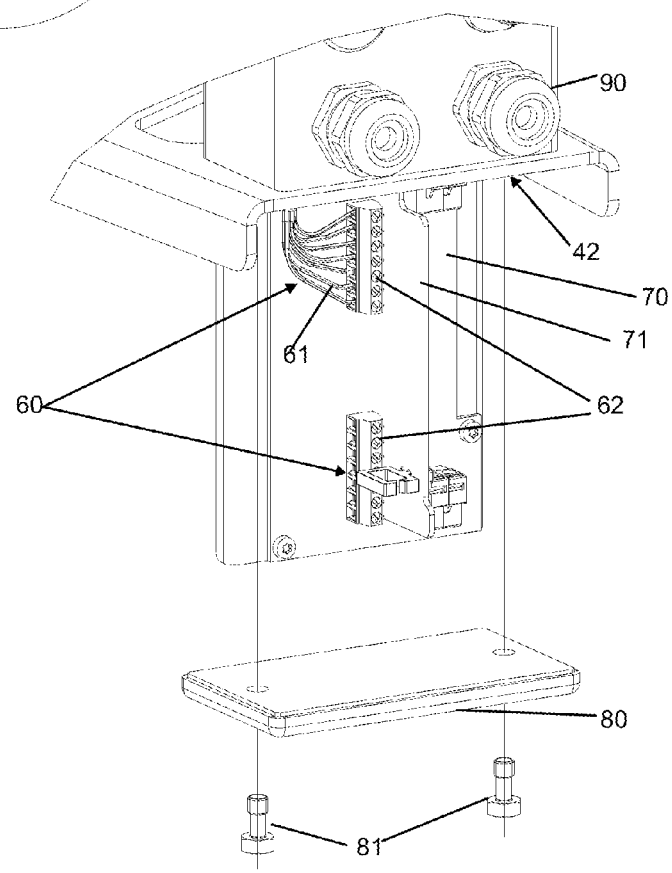
FIG. 2b is an enlarged view of the inner workings of the pedestal chamber of the FIG. 1 weighing scale in a position for servicing.

FIG. 2b represents an enlarged view of the detail A of FIG. 2a, so it serves to more clearly visualize the inner workings of the pedestal chamber in a position for servicing. The pedestal 40 is open at the bottom. This opening is referred to as the pedestal opening 42. The pedestal opening 42 can be closed up with a closure plate 80. Fastener means 81 serve to attach the closure plate 80 to the pedestal 40. It is conceivable to use screws for the fastener means 81. However, it is also possible to use other fastener means, such as for example a snap fit of the closure plate 80. A sidewall of the pedestal 40 has two openings for the passage of the power cable 64 and the signal cable 65 (as seen in FIG. 3b). The two openings are not visible in the drawing, as they are covered up by the cable glands 90. As shown in FIG. 3b the cable glands 90 serve for the passage of the cables. Arranged inside each cable gland 90 is a seal which prevents the penetration of contaminants into the pedestal chamber 41.

The carrier element 70 has been partially pulled out of the pedestal opening 42. Arranged on the carrier element 70 are connector elements 62. The connector elements 62 are there to receive electrical wires 61 inside the weighing scale and the electrical cables for the power supply. For connector elements 62 one could use for example plug sockets or clamp terminals. To change the power connections, the closure plate 80 needs to be removed by releasing the fastener means 81. Now the carrier element 70 can be at least partially pulled out of the pedestal chamber 41 without the use of tools. By matching the electrical wires to suitable terminal elements 62, the cable connections for the power supply can be exchanged. The procedure is analogous for the signal cables.

Figure 3A:
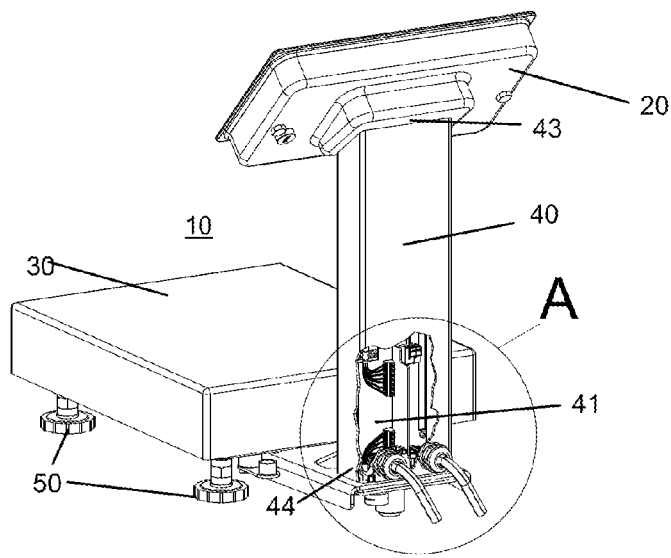
FIG. 3a is a perspective view of the backside of the FIG. 1 weighing scale in operating position.
Figure 3B:
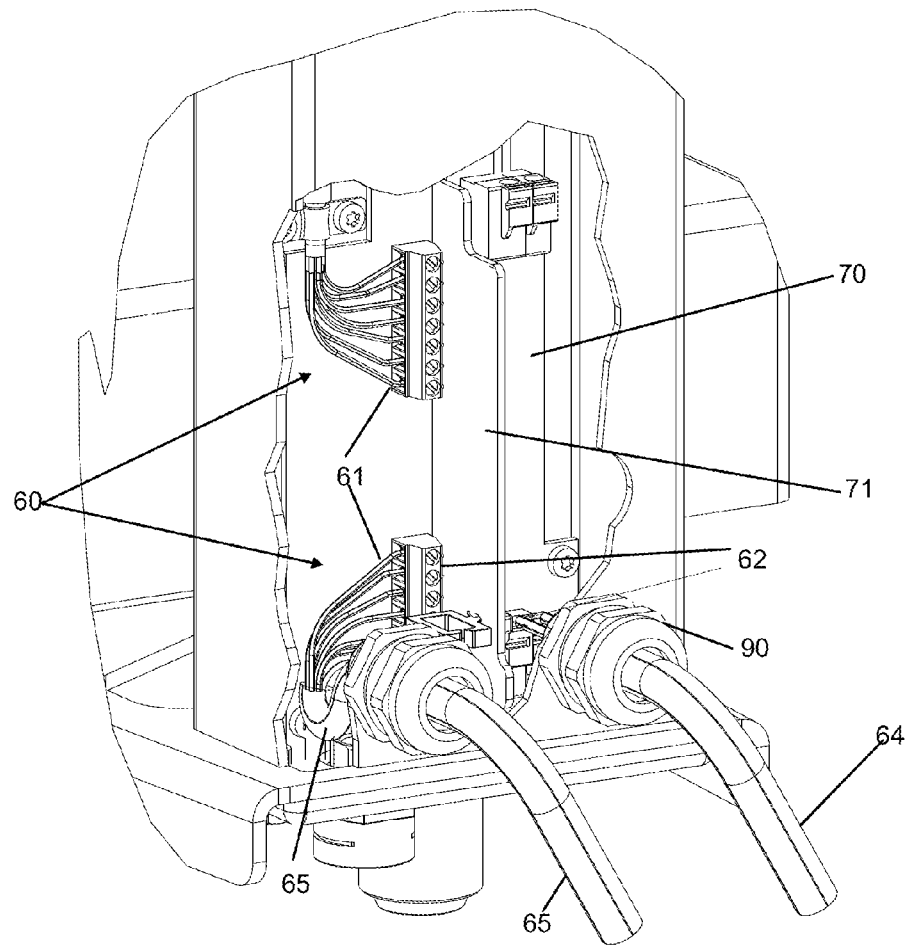
FIG. 3b is an enlarged view of the inner workings of the pedestal chamber in operating position.

FIG. 3a shows a perspective view of the backside of the weighing scale 10 in its operating position. To illustrate the inner workings of the pedestal chamber 41, the pedestal housing 41 is shown partially broken away.

FIG. 3b shows the detail marked by the circle A in FIG. 3a, showing the inner workings of the pedestal chamber 41 in operating position. The electrical power supply cables 64 pass through a lateral opening into the pedestal chamber 41. The electrical cables 64 are connected to the scale electronics 60 through connector elements 62. The signal connections 65 enter through a further lateral opening into the pedestal chamber 41. The signal wires 65 are likewise connected to the scale electronics 60 by means of connector elements 62.

The connector elements 62 are arranged on the carrier element 70. The carrier element is of an essentially flat configuration. Positioning elements 71 are arranged standing perpendicular to the flat surface of the carrier element 70. The dimensions of the carrier element 70 with the positioning elements 71 approximately match the dimensions of the pedestal chamber 41. The carrier element 70 can thus be inserted into the pedestal chamber 41 with a precise fit. To facilitate pulling the carrier element 70 out of the pedestal chamber 41, the carrier element 70 needs to be dimensioned slightly smaller than the pedestal chamber 41.

At least one positioning element can be configured as an upstanding wall which separates a surface of the carrier element 70 into two domains. In a preferred embodiment, the connector terminal for the electrical power cable 64 is arranged in one of the domains and the signal cable 65 in the other domain. This arrangement offers the advantage that the electrical wires 64 are spatially separated from the signal leads 65 and harmful interference between the conductors 64 and 65 is diminished. The carrier element 70 and the upstanding wall are preferable made of metal. However, other materials, polymers in particular, are also suitable.

While the invention has been described through the presentation of a specific example of an embodiment, it is evident that numerous further variants can be created based on knowledge gained from the present invention.

What is claimed is:

1. A scale for weighing, comprising:
a display/operating unit;
a scale platform;
an electronic system for controlling the scale; and
a pedestal that connects the display/operating unit to the scale platform, the pedestal comprising:
  a pedestal chamber,
  a pedestal opening;
  a carrier element that is arranged in or at the pedestal chamber, such that at least one portion of the electronic system is arranged on the carrier element, with the at least one portion arranged to be at least partially taken out of the pedestal opening for servicing; and
  tracks for guiding the carrier element in the pedestal chamber.

2. The scale of claim 1, wherein:
the pedestal is of an elongated shape with first and second ends, the display/operating unit arranged at the first end and the scale platform arranged at the second end.

3. The scale of claim 2, wherein:
the pedestal opening is oriented orthogonal to the lengthwise direction of the pedestal, at the second end thereof.

4. The scale of claim 3, further comprising:
means for closing the pedestal opening.

5. The scale of claim 4, wherein:
the means for closing the pedestal opening is a closure plate that also operates as the carrier element.

6. The scale of claim 1, wherein:
the parts of the electronic system that are arranged on the carrier element are not sensitive to dirt.

7. The scale of claim 1, wherein:
parts of the electronic system that are sensitive to dirt are arranged in the scale platform or in the display/operating unit.

8. The scale of claim 1, wherein:
the carrier element is adapted to be slidably seated in the pedestal chamber.

9. The scale of claim 1, wherein:
the carrier element has outer dimensions that approximately match the internal dimensions of the pedestal chamber.

10. The scale of claim 1, wherein:
the carrier element has a predominantly flat configuration.

11. The scale of claim 1, further comprising:
elements for positioning the carrier element in the pedestal chamber, the elements being arranged on two opposite sides of the carrier element.

12. The scale of claim 1, further comprising:
tracks for guiding the seating of the carrier element in the pedestal chamber.

13. The scale of claim 1, further comprising:
electrical power supply conductors, adapted for receiving electrical power from a source external to the scale, the electrical conductors being connected to the parts of the electronic system that are arranged on the carrier element.

14. The scale of claim 13, further comprising:
signal conductors, adapted for transmitting signals between the scale and a device external thereto, the signal conductors being connected to the parts of the electronic system that are arranged on the carrier element.

15. The scale of claim 14, further comprising:
connector elements, each connector element arranged on the carrier element and serving to connect the an electrical power supply conductor or a signal conductors to a corresponding internal conductor of the scale.

16. The scale of claim 1, wherein:
the carrier element serves as a closure plate for the pedestal opening.

17. The scale of claim 1, further comprising:
means for closing the pedestal opening.

18. The scale of claim 17, wherein:
the means for closing the pedestal opening is a closure plate that also operates as the carrier element.

19. The scale of claim 1, wherein:
the electronic system comprises a first portion and a second portion, with the first portion arranged on the carrier element and the second portion arranged on at least one of: the scale platform and the display/operating unit.

20. A scale for weighing, comprising:
a display/operating unit;
a scale platform;
an electronic system for controlling the scale; and
a pedestal that connects the display/operating unit to the scale platform, the pedestal comprising:
  a pedestal chamber,
  a pedestal opening; and
  a carrier element that is arranged in or at the pedestal chamber, such that at least one portion of the electronic system is arranged on the carrier element, with the at least one portion arranged to be at least partially taken out of the pedestal opening for servicing, the carrier element configured as a closure plate for closing the pedestal opening.

* * * * *